US009427899B2

(12) United States Patent
Kennedy et al.

(10) Patent No.: US 9,427,899 B2
(45) Date of Patent: Aug. 30, 2016

(54) DEVICE FOR COMPRESSING A COMPOSITE RADIUS

(71) Applicant: The Boeing Company, Chicago, IL (US)

(72) Inventors: Thomas J. Kennedy, Bonney Lake, WA (US); David A. Fucci, Cypress, CA (US)

(73) Assignee: THE BOEING COMPANY, Chicago, IL (US)

( * ) Notice: Subject to any disclaimer, the term of this patent is extended or adjusted under 35 U.S.C. 154(b) by 44 days.

(21) Appl. No.: 14/594,170

(22) Filed: Jan. 12, 2015

(65) Prior Publication Data

US 2016/0176080 A1    Jun. 23, 2016

Related U.S. Application Data

(62) Division of application No. 12/983,337, filed on Jan. 3, 2011, now Pat. No. 8,961,732.

(51) Int. Cl.
*B29C 65/00* (2006.01)
*B32B 37/00* (2006.01)
*B29C 43/36* (2006.01)
*B29C 70/44* (2006.01)

(52) U.S. Cl.
CPC ..... *B29C 43/3642* (2013.01); *B29C 66/81455* (2013.01); *B29C 70/44* (2013.01); *B29C 2043/3644* (2013.01); *B29C 2043/3655* (2013.01)

(58) Field of Classification Search
CPC . B29C 65/00; B29C 66/00145; B32B 37/00; B32B 37/10
See application file for complete search history.

(56) References Cited

U.S. PATENT DOCUMENTS

| 4,217,157 | A | 8/1980 | Stoltze et al. | |
| 4,407,685 | A | 10/1983 | Hankland | |
| 4,560,428 | A | 12/1985 | Sherrick et al. | |
| 4,608,220 | A | 8/1986 | Caldwell et al. | |
| 5,242,523 | A | 9/1993 | Willden et al. | |
| 5,597,435 | A * | 1/1997 | Desautels et al. | ............ 156/245 |
| 5,746,553 | A | 5/1998 | Engwall | |
| 5,876,546 | A | 3/1999 | Cloud | |
| 6,012,883 | A | 1/2000 | Engwall et al. | |
| 6,168,358 | B1 | 1/2001 | Engwall | |
| 6,565,690 | B1 | 5/2003 | Cerezo Pancorbo et al. | |
| 7,052,573 | B2 | 5/2006 | Pham et al. | |

(Continued)

FOREIGN PATENT DOCUMENTS

| CN | 101855052 A | 10/2010 |
| EP | 0368734 A1 | 5/1990 |

(Continued)

OTHER PUBLICATIONS

International Search Report and Written Opinion, dated Feb. 23, 2012, regarding Application No. PCT/US2011/061279, 13 pages.
International Preliminary Report on Patentability; Written Opinion, dated Jul. 10, 2013, regarding application PCT/US2011/061279, filing date Nov. 17, 2011, applicant The Boeing Company, 8 pages.
First Office Action and English Translation, dated Jan. 7, 2015, regarding Application No. CN201180063888.8, 13 pages.

(Continued)

*Primary Examiner* — Michael N Orlando
*Assistant Examiner* — Matthew Hoover
(74) *Attorney, Agent, or Firm* — Yee & Associates, P.C.

(57) ABSTRACT

A bow wave in a composite laminate generated during part consolidation is reduced by transmitting atmospheric pressure loads to a region of the part having low compaction pressure due to bridging of a vacuum bag at an edge of the part.

18 Claims, 8 Drawing Sheets

(56) References Cited

U.S. PATENT DOCUMENTS

| | | | |
|---|---|---|---|
| 7,306,450 B2 * | 12/2007 | Hanson | 425/383 |
| 7,534,387 B2 | 5/2009 | Zenkner et al. | |
| 7,951,318 B2 | 5/2011 | Hanson | |
| 8,961,732 B2 | 2/2015 | Kennedy et al. | |
| 2003/0188821 A1 | 10/2003 | Keller et al. | |
| 2005/0112394 A1 | 5/2005 | Pham et al. | |
| 2008/0054523 A1 | 3/2008 | Hanson | |
| 2009/0081410 A1 | 3/2009 | Albertson et al. | |
| 2012/0168071 A1 | 7/2012 | Kennedy et al. | |

FOREIGN PATENT DOCUMENTS

| | | |
|---|---|---|
| JP | H04270610 A | 9/1992 |
| JP | H04320826 A | 11/1992 |
| JP | 2001150575 A | 6/2001 |
| JP | 2003312590 A | 11/2003 |
| JP | 2004352187 A | 12/2004 |
| JP | 2007015351 A | 1/2007 |
| WO | WO2012094063 A1 | 7/2012 |

OTHER PUBLICATIONS

Musch et al., "Tooling with Reinforced Elastomeric Materials", Composites Manufacturing, vol. 3, No. 2, Jan. 1992, pp. 101-111.

Office Action, dated Nov. 16, 2012, regarding U.S. Appl. No. 12/983,337, 20 pages.

Final Office Action, dated May 17, 2013, regarding U.S. Appl. No. 12/983,337, 12 pages.

Office Action, dated Jul. 17, 2014, regarding U.S. Appl. No. 12/983,337, 13 pages.

Notice of Allowance, dated Oct. 8, 2014, regarding U.S. Appl. No. 12/983,337, 9 pages.

Second Office Action and English Translation, dated May 11, 2015, regarding Application No. CN201180063888.8, 17 pages.

Notices of Reasons for Rejection and English Translation, dated Jul. 16, 2015, regarding Japanese Patent Application No. 2013-547477, 5 pages.

* cited by examiner

017
DEVICE FOR COMPRESSING A COMPOSITE RADIUS

This application is a divisional application of Ser. No. 12/983,337, filed Jan. 3, 2011.

TECHNICAL FIELD

This disclosure generally relates to methods and equipment for fabricating fiber reinforced resin laminates, and deals more particularly with a method and device for compressing a radius in the laminate.

BACKGROUND

Fiber reinforced resin laminates may be consolidated prior to and/or during curing in order to eliminate voids and other inconsistencies in the cured part. Consolidation may be achieved by applying pressure to the uncured laminate using vacuum bagging and/or autoclaving processes. In some cases, a caul plate is placed between the vacuum bag and certain areas of the laminate such as a radius, in order to assure that the applied pressure is evenly distributed over these areas. In some part geometries, regions of low pressure may exist over the part for any of a variety of reasons, such as bridging of the vacuum bag over certain features of the part. These low pressure areas may result in a "bow wave" being generated in the outer plies of the laminate, in which an out-of-plane wave of the plies is forced from regions of high pressure to the regions of the low pressure mentioned above. Bow waves are undesirable because they result in out-of-plane fiber distortions that may cause voids in the laminate.

Accordingly, there is a need for a method and a device for reducing bow waves in fiber reinforced resin laminates during consolidation, particularly those that may occur near the edge of a radius in the laminate. There is also a need for reducing regions areas of low pressure on the laminate caused by bridging of a vacuum bag.

SUMMARY

The disclosed method and device reduce bow waves in the laminate plies caused by bridging of a vacuum bag used to consolidate the laminate. The device is relatively simple in construction, is reusable and easily installed. The device is used to compress a region of low pressure area on the laminate, such as an edge of a radius, caused by bridging of the bag over the radius edge. The device includes a first caul covering the radius, and a second caul covering the first portion and the radius edge. The second caul may also overlie a second laminate such that consolidation pressure applied to the second laminate is transferred through the second caul onto the radius edge. In one embodiment, the first and second cauls may be integrated to form a single unit. In other embodiments, multiple devices may be joined together side-by-side. The disclosed embodiments may reduce bow waves in laminates during the consolidation process, resulting in cured parts which may exhibit reduced voids and inconsistencies, and desired mechanical properties.

According to one disclosed embodiment, a method is provided of reducing a bow wave in a composite laminate part during consolidation. The method comprises transmitting atmospheric pressure loads to a region of the part having a low compaction pressure due to bridging of a vacuum bag at an edge of the part. The region of low pressure may be located at an edge of a radius in the part. Transmitting atmospheric pressure loads may include applying the transmitted loads at the radius edge using a caul on the part at the region of low pressure.

According to another embodiment, a method is provided of reducing a bow wave produced in a region of low compaction pressure of a first uncured composite part during consolidation in a vacuum bag with a second composite part. The method comprises placing a caul device over the first and second parts covering the low pressure region, and using the caul to apply atmospheric pressure loads to the low pressure region of the first part. The region of low pressure may be along an edge of a radius on the first part. Placing the caul includes placing a first caul over the radius and the radius edge on the first part, and placing a second caul on the second part overlapping the first caul. Using the caul to apply pressure includes using the second caul to apply pressure to the first caul in the region of low pressure.

According to a further embodiment, a method is provided of compressing a radius section of a fiber reinforced laminate part during consolidation. The method comprises forming a large radius in the part adjacent the radius section, and applying compaction pressure to the part, including applying tension on the fibers in the radius section by compressing the fibers in the large radius. Forming the large radius in the part includes forming an excess curved flange on the part.

According to still another embodiment, a device is provided for reducing a bow wave at an edge of a composite laminate part during consolidation. The device comprises a caul configured to substantially conform to the shape of and apply compaction pressure to the edge. The edge may be located along a radius in the part, and the caul includes a first portion adapted to be placed on and apply pressure to the radius, and a second portion having an extremity overlying the first portion and the edge of the part. The first and second portions of the caul maybe formed integral with each other.

In still another embodiment, apparatus is provided for tensioning fibers in a radius of a fiber reinforced composite laminate part during consolidation. The apparatus comprises a mandrel having a large radius in an excess flange area of the mandrel, wherein the large radius has a radius of curvature greater than that of the radius of the part.

In another embodiment, a device is provided for reducing a bow wave generated in a radius of a composite laminate part during consolidation. The device comprises a caul for applying pressure to the radius of the part. The caul includes a first portion adapted to cover the radius and an edge contiguous to the radius in which a bow wave in the part is generated. The caul further includes a second portion overlying the first portion and the edge of the part for applying pressure to the edge of the part through the second portion of the caul.

BRIEF DESCRIPTION OF THE ILLUSTRATIONS

DETAILED DESCRIPTION

Figure 1:
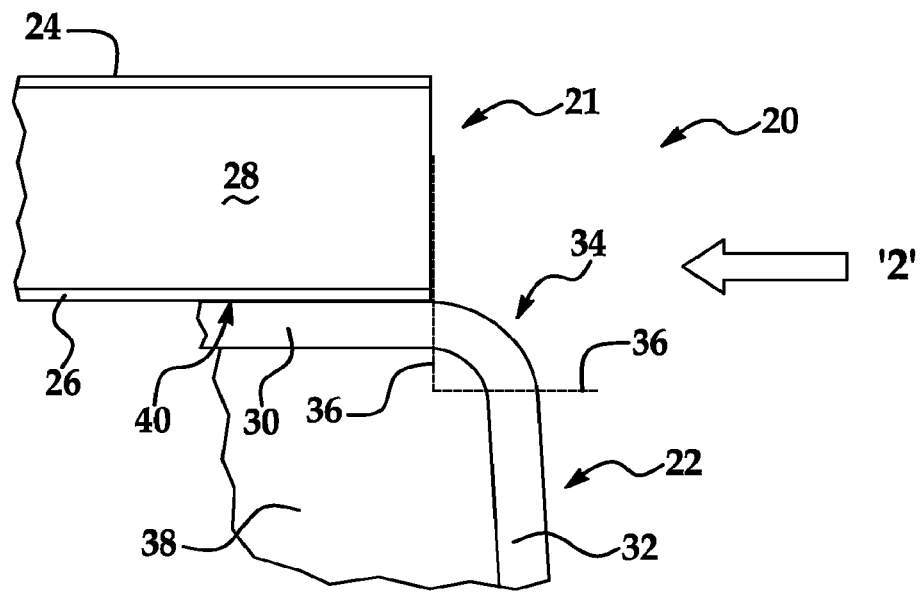
FIG. 1 is an illustration of a side view of a composite structure assembly.
Figure 2:
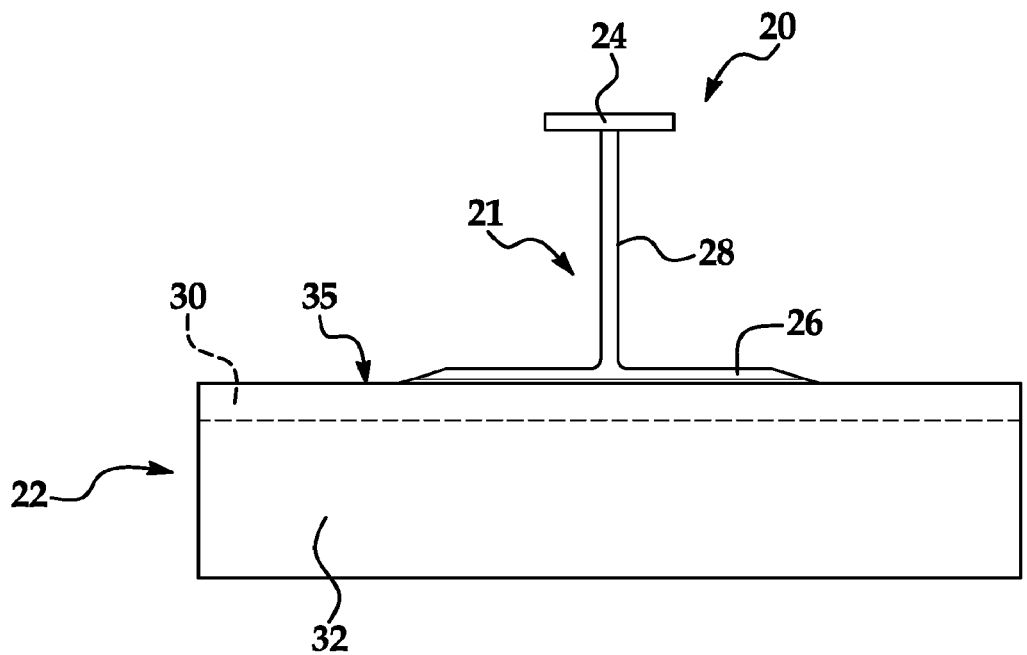
FIG. 2 is an illustration of a side view taken in the direction '2' in FIG. 1.

Referring first to FIGS. 1 and 2, a composite structure assembly 20 comprises a stiffener 21, sometimes also referred to as a first part, and a spar 22 sometimes also referred to herein as a second part. The stiffener 21 is bonded to a spar 22 by a layer of adhesive 40. The stiffener 21 may comprise a fiber reinforced resin composite, and in the illustrated example, has an I-shaped cross section formed by upper and lower flanges 24, 26 joined together by a web 28. While an I-shape cross section is shown in the Figures, the stiffener 21 may have other cross sectional shapes, such without limitation, C, J, Z, L and inverted U shapes. The spar 22 comprises a fiber reinforced resin laminate having a web 30 and a flange 32 forming an L-shaped cross section, however other cross section geometries are possible, such as, without limitation, a "C" section. The spar 22 may form, for example and without limitation, part of the airframe of an aerospace vehicle (not shown) such as a wing or a stabilizer (not shown).

The web 30 transitions to the flange 32 through a radius 34 defined between tangent points indicated by the broken lines 36 in FIG. 1. As best seen in FIG. 2, the lower flange 26 of the stiffener 21 overlies and is bonded to the upper surface 35 of the web 32. FIG. 1 illustrates a mandrel 38 for supporting the spar 22 during consolidation and curing of the spar 22. In the illustrated example, the stiffener 21 is a pre-cured part that is bonded to the spar 22, however, in other embodiments, the stiffener 21 may comprise an uncured composite part that is co-cured with the spar 22. The shapes of the stiffener 21 and the spar 22 merely illustrate a wide variety of possible part shapes and geometries.

Figure 3:
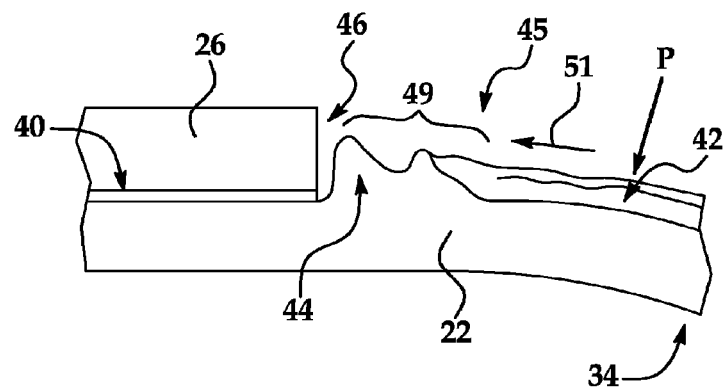
FIG. 3 is an illustration of an enlarged sectional view showing the formation of a bow wave in the upper plies of the spar at the end of the stiffener.

Referring now to FIG. 3, after the stiffener 21 and the spar 22 are assembled with a layer of adhesive 40 therebetween, a vacuum bag (not shown in FIG. 3) is sealed over the assembly 20, which may then be placed in an autoclave (not shown) for consolidation and curing. The radius 34 has an upper edge 45 that is spaced from the outer end 46 of the lower flange of the stiffener 21. When evacuated, the bag may bridge over the edge 45 of the radius 34. Bridging of the bag over the edge 45 may result in a region 49 of low compaction pressure at the edge 45 when autoclave pressure P is applied during consolidation and curing of the spar 22. The applied compaction pressure P results in deformation of the fibers in the upper plies along the radius 34 which urges them to move in the direction of the arrow 51 toward the region of low pressure 49. The movement of the fiber toward to the low pressure region 49 may result in the generation of a bow wave 44 in the upper plies 42 of the spar 22 as the plies 42 are being compressed in the other areas of the radius 34. This bow wave 44 may result wrinkles, voids or other undesired inconsistencies in the spar 22 following curing.

Figure 4:
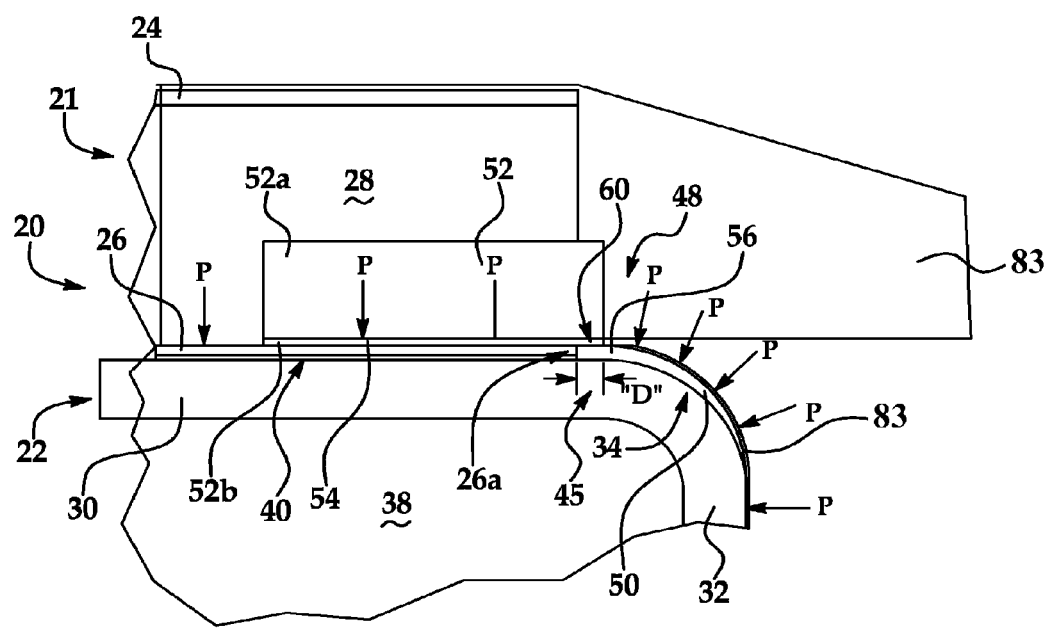
FIG. 4 is an illustration of a sectional view of the composite structure assembly, showing the use of a caul device to reduce the bow wave shown in FIG. 3.

Referring to FIG. 4, in order to reduce or eliminate the bow wave 44 shown in FIG. 3 caused by the region 49 (FIG. 3) of low pressure, a device 48 is installed over the radius 34 of the spar 22 and the lower flange 26 of the stiffener 21. The device 48 includes a first, bottom caul 50 covering the radius 34 of the spar 22, including the upper edge 45. The upper extremity 56 of the first caul 50 abuts the outer end 26 of the lower flange 26. The device 48 further includes a second, top caul 52 that rests on the lower flange 26 and overlies the upper extremity 56 of the first caul 50. The second caul 52 overlaps the upper extremity 56 of the first caul 50 by a preselected distance D. As will be discussed below in more detail, in one embodiment, the first and second cauls 50, 52 may be integrated into a single unit, while in other embodiments they may be separate units. A vacuum bag 44 is sealed over the assembly 20 and is used to apply compaction pressure to the parts and the caul 48.

Figure 5:
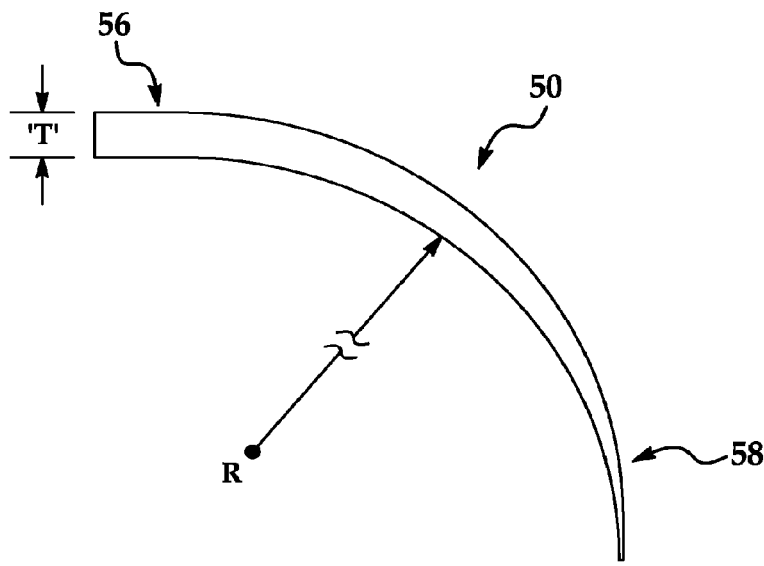
FIG. 5 is an illustration of a sectional view of a first caul forming part of the caul device shown in FIG. 4.

As shown in FIG. 5, the first caul 50 includes an inside radius R substantially conforming to the radius 34. The first caul 50 has a thickness T at its upper extremity which generally matches the combined thickness of the lower flange 26 and the layer of adhesive 30. The first caul 50 is tapered in its thickness from its upper extremity 56 to its lower extremity 58. The reduced thickness of the lower extremity 58 resulting from this tapering may reduce mark-off imparted to the spar 22 by the first caul 50 during the compaction process. In other embodiments, the first caul 50 may not be tapered in its thickness.

Figure 6:
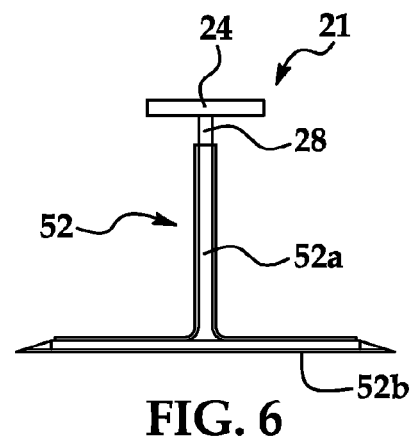
FIG. 6 is an illustration of an end view of a second caul forming part of the device shown in FIG. 4.

Referring to FIG. 6, the second caul 52 includes a slotted web 52a covering the web 28 of the stiffener 21, and longitudinally extending flanges 52b which overlie the flanges 26 on the stiffener 21.

Referring to FIG. 4 in use, the device 48 is installed either as two separate units or as a single unit on the assembly 20, such that the first caul 50 overlies the radius 34 and has its upper extremity 56 abutting the outer end 26a of the flange 26. The slotted web 52a of the second caul 52 is sleeved over the sides of the web 28 such that the flanges 54 rest on the flanges 26 of the stiffener and the outer end 60 overlies and rests on the upper extremity 56 of the first caul 50. With the device 40 installed as described above, the vacuum bag 44 may be installed over the assembly 20, and the assembly 20 may be processed in an autoclave where pressure P is applied to the assembled parts. The first caul 50 applies and distributes the autoclave pressure P to the radius 34 including the upper extremity 56 which overlies the upper edge 45 of the radius 34. The autoclave pressure P also presses the flanges 52b against the flanges 26 of the stiffener 21 and against the upper extremity 56 of the first caul 50.

Pressure applied to the lower flanges 26 is transferred by the second caul 52 to the first caul 50. The tendency of the upper plies 42 (FIG. 3) to produce a bow wave 44 at the edge 45 is resisted by the pressure applied to the upper extremity 56 by the forward end 60 of the second caul 52. Thus, the upper plies 32 (FIG. 3) within the radius 34 are constrained to remain substantially in-plane during the compaction process. Integrating the caul portions 50, 52 into a single part unit provide the device 48 with additional stiffness 48 which may aid in resisting generation of a bow wave 44 (FIG. 4) or similar heaving or wrinkling of the outer plies 42 at the radius edge 45.

Figure 7:
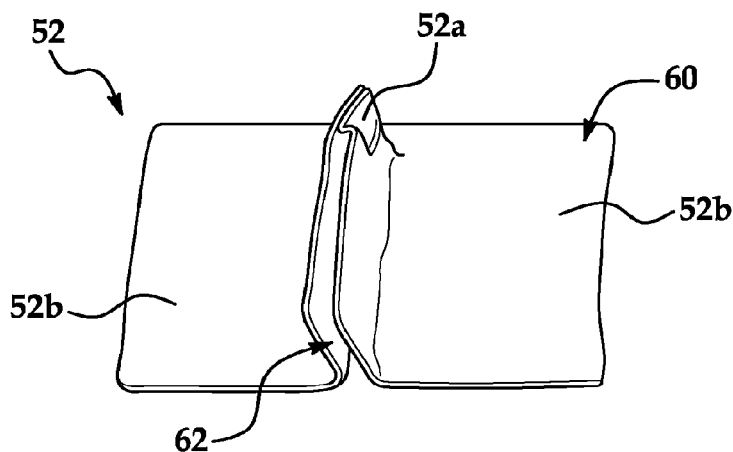
FIG. 7 is an illustration of a perspective view of the second caul.
Figure 8:
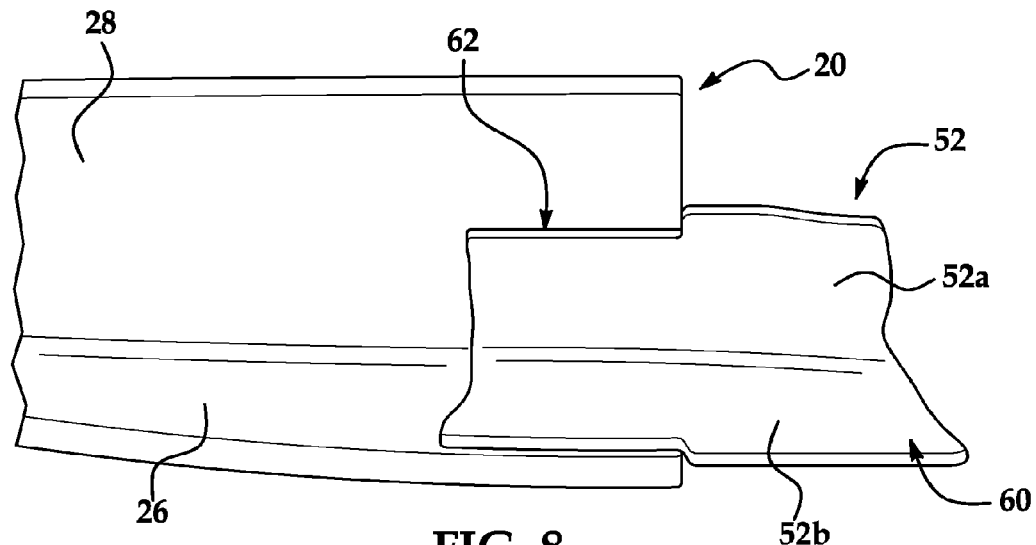
FIG. 8 is an illustration of a perspective view of one side of the stiffener shown in FIGS. 1-4 having the second caul installed thereon.

FIGS. 7 and 8 illustrate additional details of the second caul 52. The upstanding web 52a includes a longitudinally extending slot 62 therein, and the flanges 52b extend laterally outward from the web 52a. The forward end 60 extends beyond the web 52a and is adapted to overlie the upper extremity 56 on the first caul 50, as shown in FIG. 4. The second caul 52 may be fabricated from any suitable materials that possess the requisite strength and stiffness, including but not limited to a fiber reinforced resin composite such as, without limitation, carbon fiber reinforced epoxy resin. During installation of the second caul 52, the slot 62 receives the web 28 of the stiffener 21 is received within the slot 62, and the flanges 52b rest on the flanges 26 of the stiffener 21.

Figure 9:
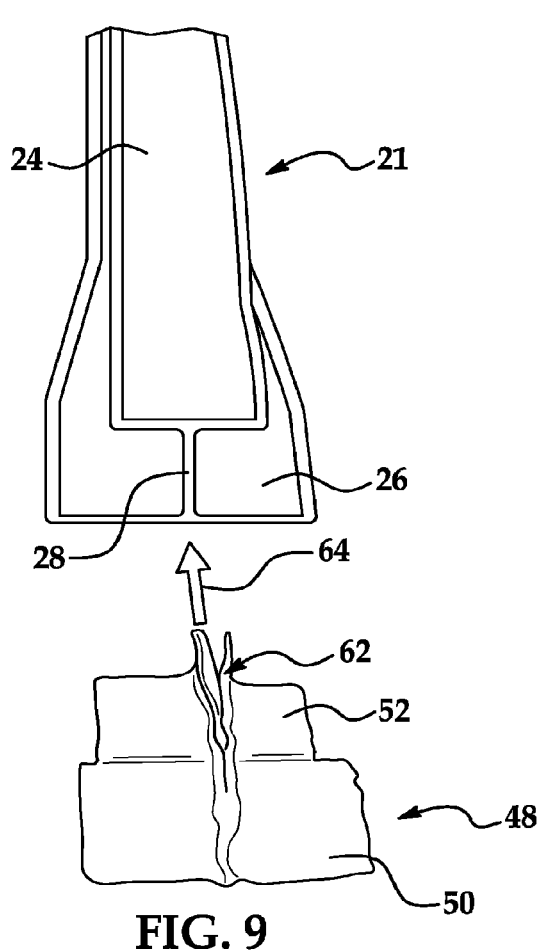
FIG. 9 is an illustration of an isometric view of another form of the caul device being installed on the stiffener.

FIG. 9 illustrates another embodiment of the device 48 in which the first and second cauls 50, 52 are integrated into a single unit which may be manufactured by molding the caul 48 around the end of the stiffener 21.

Figure 10:
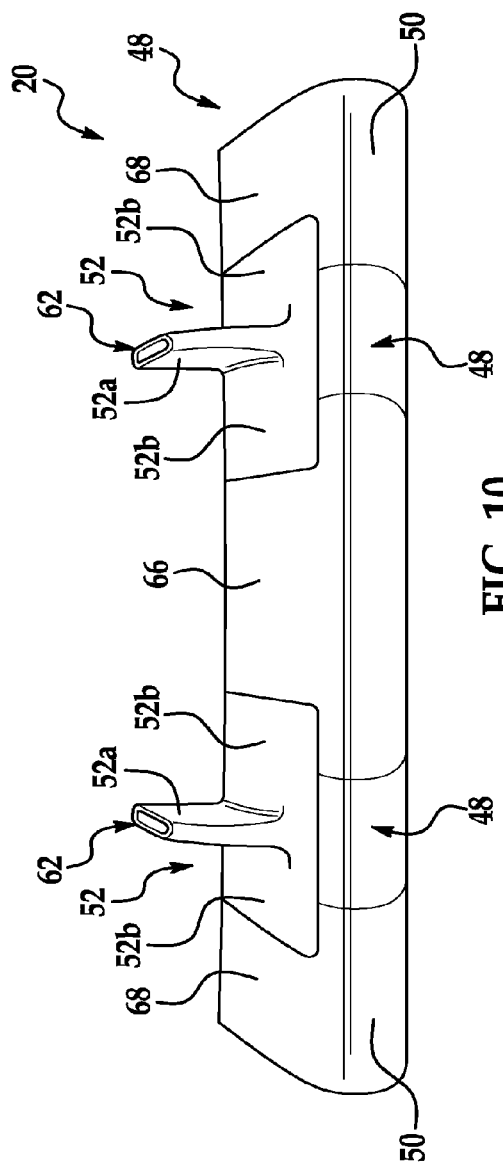
FIG. 10 is an illustration of a perspective view of one side of another embodiment of the caul device.
Figure 11:
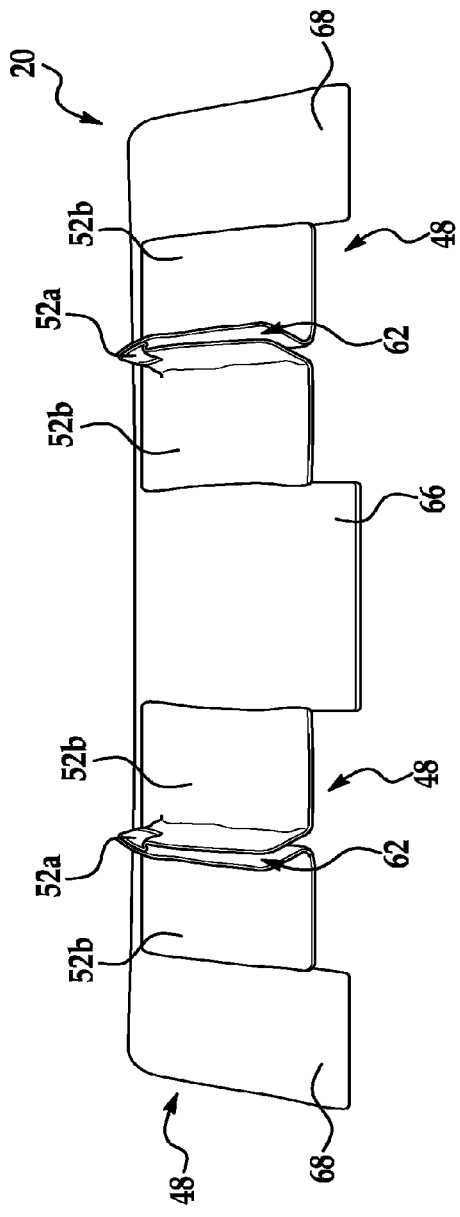
FIG. 11 is an illustration of an isometric view of the opposite side of the caul device shown in FIG. 10.
Figure 12:
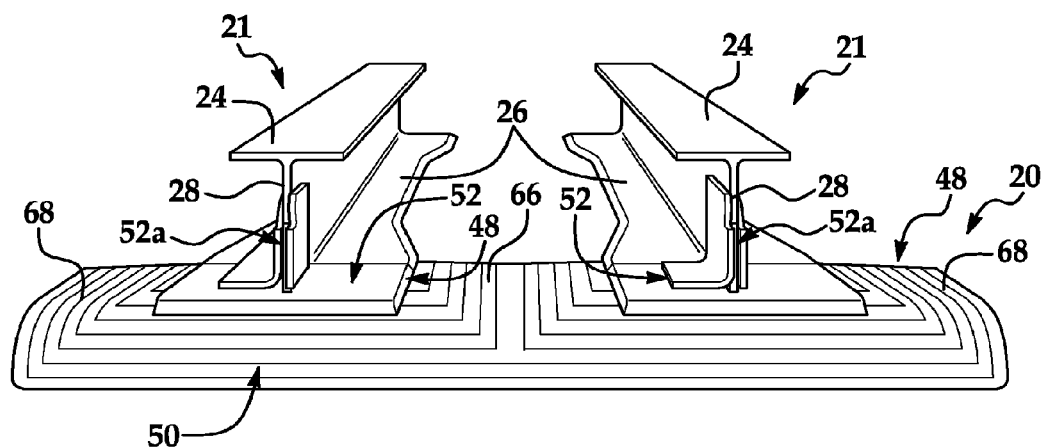
FIG. 12 is an illustration of the caul device shown in FIGS. 10 and 11 installed on a pair of the stiffeners.

Attention is now directed to FIGS. 10, 11 and 12 which illustrate another embodiment of the device 20 in which multiple devices 48 are integrated into a unitized structure. In the illustrated example, two one piece cauls are arranged side by side and formed integral with a connecting portion 66 and outer extensions 68. The first cauls 50 extend substantially continuously across the entire length of the device 48. As shown in FIG. 12, the device 48 may be installed as a single unit over two adjacent stiffeners 21, covering the radius 34 on the spar (not shown in FIGS. 10-12). While the embodiment shown in FIGS. 10-12 integrates multiple devices 48 for use with multiple stiffeners 21 have an I-shape cross section, the multiple integrated devices 48 may also be adapted for use with stiffeners having other cross sectional shapes, including, without limitation, C, J, Z, L and inverted U shapes.

Figure 13:
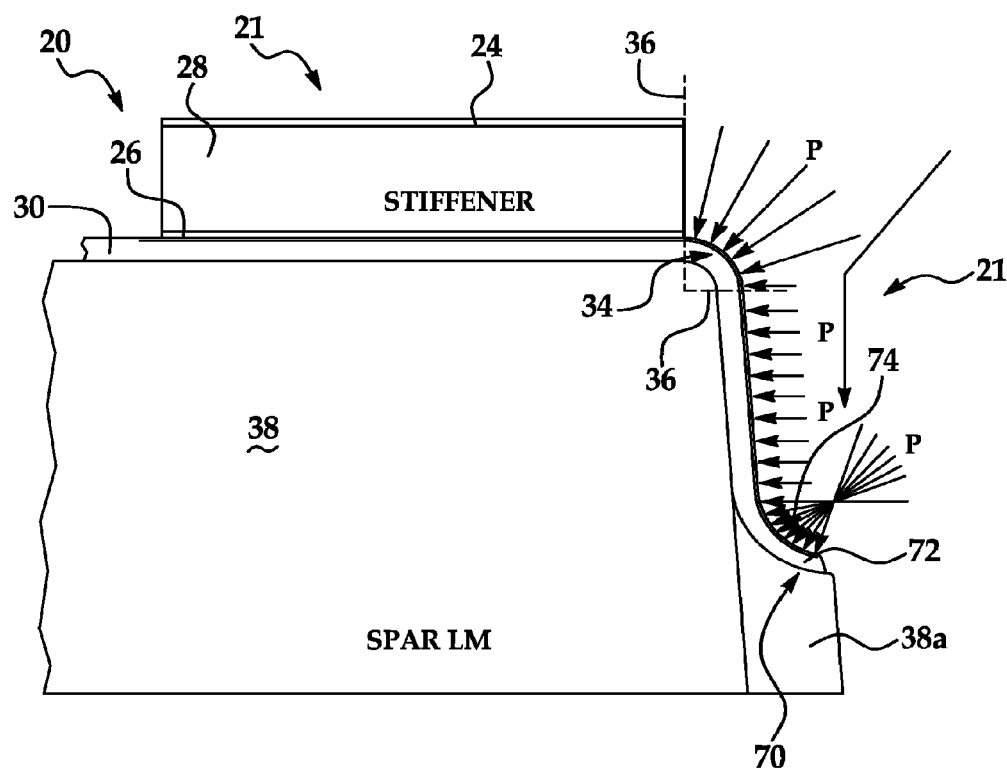
FIG. 13 is an illustration of a sectional view of a laminate assembly showing an alternate method of reducing bow waves.

Attention is now directed to FIG. 13 which illustrates another method of compressing a radius 34 in a manner that reduces bow waves generated during consolidation of the spar 30. In this example, the spar 30 is laid up over a mandrel 38 having a lateral extension 38a. The lateral extension 38a includes a curved tool surface 70 that forms an excess outwardly turned flange 72 having a large radius 74 which is generally larger than radius 34. "Excess" refers to the fact that the primary purpose of the flange 72 is to place the fibers in the radius 34 in tension, and that the flange 72 may not have other substantial functional purpose. When consolidation pressure P is applied to the spar 30, pressure acting on the large radius flange 72 is greater than that applied to the radius 34 and creates tension in the fibers in the upper plies 42 (FIG. 3) which is transferred to the fibers in the radius 34. This tension applied to the fibers in the upper plies 42 in the radius 34 may reduce or eliminate wrinkling and/or bow waves 44 in the area of the radius 34, including the upper edge 45 (FIG. 3). As used herein, "large" radius refers to a radius 74 that is large enough to produce the tension in the upper plies 42 necessary to reduce or eliminate the bow waves 44.

Figure 14:
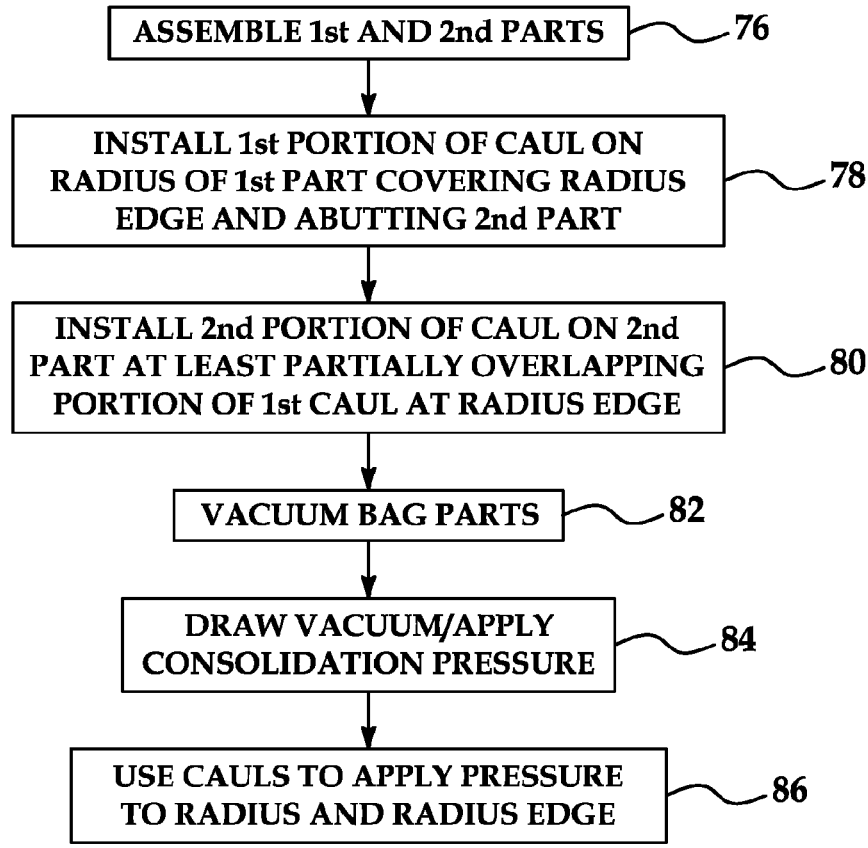
FIG. 14 is a simplified flow diagram illustrating a method for reducing a bow wave.

Attention is now directed to FIG. 14 which illustrates a method of joining composite parts in a manner that reduces bow waves in laminates during curing. At step 76, first and second parts 21, 22 are assembled. Next at step 78, a first portion 50 of a caul 48 is placed on the radius 34 of the first part 22 covering an edge 45 of the radius 34 and abutting the first part 21. At step 80, a second portion 52 of the caul 48 is installed on the second part 21, at least partially overlapping the first caul 50 at the radius edge 45. In those embodiments where the caul portions 50, 52 are integrated into a single unit, then steps 78 and 80 are combined into a single operation. At step 82, the assembled parts 21, 22 having the caul portions 50, 52 installed thereon are vacuum bagged. At 84, a vacuum is drawn and consolidation pressure is applied to the bag, using for example, autoclave processing. At step 86, caul portions 50, 52 are used to apply pressure to the radius 34 including the radius edge 45 in order to transfer atmospheric pressure loads to the radius edge 45 and reduce the formation of bow waves in the first part.

Figure 15:
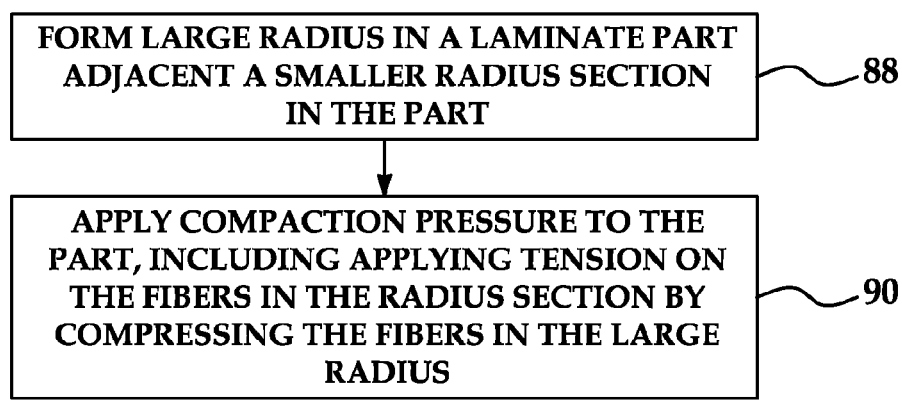
FIG. 15 is an illustration of an alternate method of reducing a bow wave.

FIG. 15 illustrates the steps of a method of reducing bow waves in a laminate using the apparatus shown in FIG. 14. At step 88, a large radius 74 is formed in a laminate part 21 adjacent a smaller radius section 34 in the part 21. At step 80, compaction pressure is applied to the part 21, including applying tension on the fibers in the radius section 34 by compressing the fibers in the large radius 74.

Figure 16:
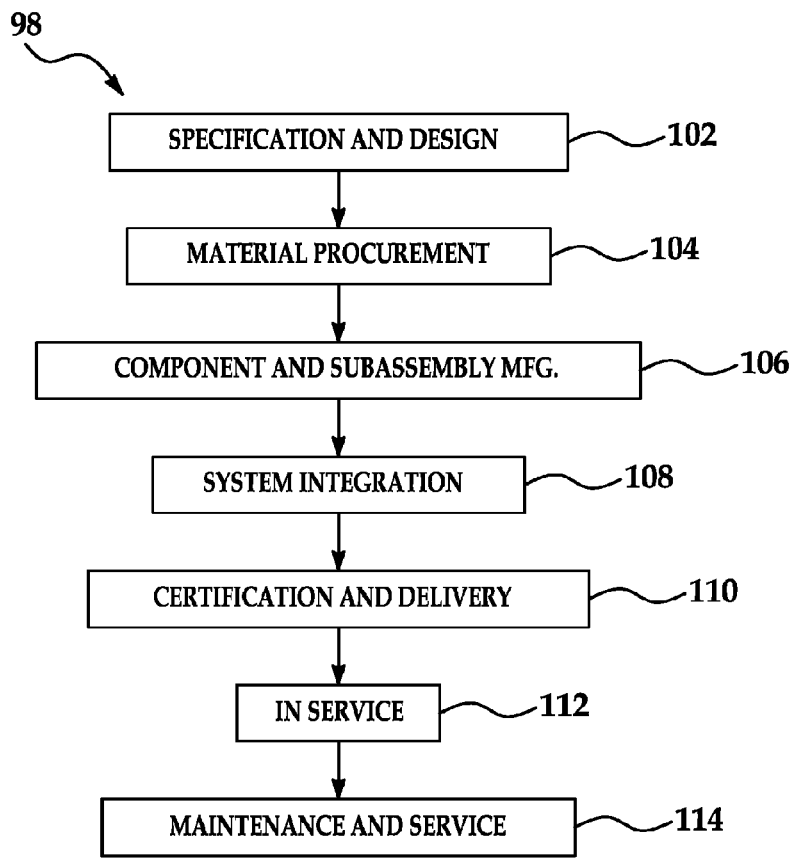
FIG. 16 is an illustration of a flow diagram of aircraft production and service methodology.
Figure 17:
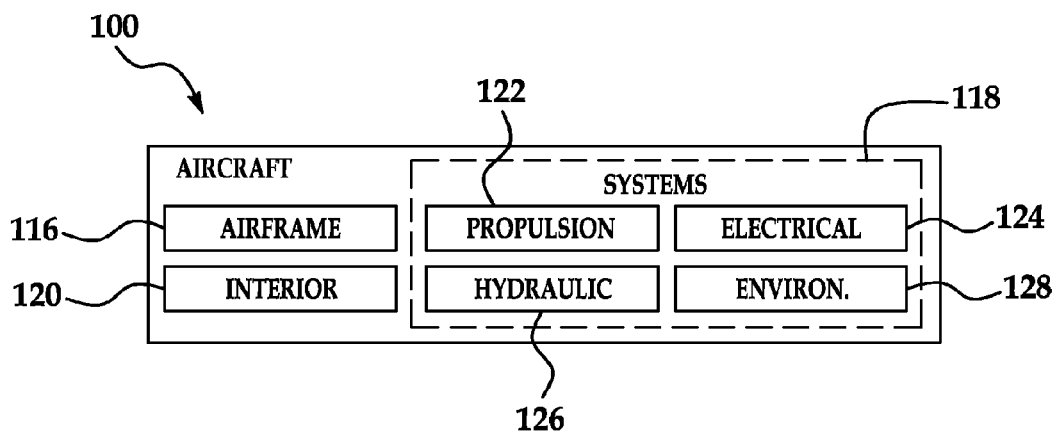
FIG. 17 is an illustration of a block diagram of an aircraft.

Referring next to FIGS. 16 and 17, embodiments of the disclosure may be used in the context of an aircraft manufacturing and service method 98 as shown in FIG. 16 and an aircraft 100 as shown in FIG. 17. During pre-production, exemplary method 92 may include specification and design 102 of the aircraft 100 and material procurement 104. During production, component and subassembly manufacturing 106 and system integration 108 of the aircraft 100 takes place. During step 106, the disclosed method and apparatus may be employed to fabricate composite parts such as fuselage sections which are then assembled at step 108. Thereafter, the aircraft 100 may go through certification and delivery 110 in order to be placed in service 112. While in service by a customer, the aircraft 100 may be scheduled for routine maintenance and service 114 (which may also include modification, reconfiguration, refurbishment, and so on).

Each of the processes of method 98 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 100 produced by exemplary method 98 may include an airframe 116 with a plurality of systems 118 and an interior 120. The disclosed method and apparatus may be employed to fabricate fuselage sections which form part of the airframe 110. Examples of high-level systems 118 include one or more of a propulsion system 122, an electrical system 124, a hydraulic system 126 and an environmental system 128. Any number of other systems may be included. Although an aerospace example is shown, the principles of the invention may be applied to other industries, such as the automotive industry.

The apparatus embodied herein may be employed during any one or more of the stages of the production and service method 98. For example, components or subassemblies corresponding to production process 106 may be fabricated or manufactured in a manner similar to components or subassemblies produced while the aircraft 100 is in service. Also, one or more apparatus embodiments may be utilized during the production stages 106 and 108, for example, by substantially expediting assembly of or reducing the cost of an aircraft 100. Similarly, one or more apparatus embodiments may be utilized while the aircraft 100 is in service, for example and without limitation, to maintenance and service 114.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A device for reducing a bow wave at an edge of a radius on a composite laminate part during consolidation, comprising:
   a caul configured to substantially conform to the shape of the radius and apply compaction pressure to the part at the edge of the radius, the caul being moldable around a portion of the composite laminate part.

2. The device of claim 1, wherein the caul includes:
   a first portion adapted to be placed on, and apply pressure to the radius, and
   a second portion having an extremity overlying the first portion and the edge of the radius.

3. The device of claim 2, wherein the first and second portions of the caul are formed integral with each other.

4. A device for reducing a bow wave generated at an edge of a radius of a composite laminate part during consolidation, comprising:
   a caul for applying pressure to the radius of the part,
   the caul including a first portion adapted to cover the radius and the radius edge, and second portion overlying the first portion and the radius edge for applying pressure to the radius edge through the second portion of the caul, the caul being moldable around a portion of the composite laminate part.

5. The device of claim 4, wherein the first portion of the caul is tapered in thickness around the radius.

6. The device of claim 4, wherein the second portion of the caul overlies the first portion of the caul and the radius edge.

7. The device of claim 4, wherein the first and second portions of the caul are integral with each other.

8. A device for reducing a bow wave generated along an edge of a radius of a composite laminate spar being joined to a stiffener having lower flanges adjacent the radius edge during consolidation, comprising:
   a first curved caul for applying pressure to the radius edge and having a thickness that is tapered along its curvature, the first caul being moldable around a portion of the composite laminate part; and
   a second caul formed integral with the first caul, the second having laterally extending flanges respectively overlying the lower flanges of the stiffener and having an extremity overlying the radius edge for transmitting consolidation pressure from the flanges of the stiffener to the radius edge through the first caul, the second caul further including a web adapted to be sleeved over the stiffener, the second caul being moldable around a portion of the composite laminate part.

9. The device of claim 1 further comprising:
   a vacuum bag substantially surrounding both the caul and the composite laminate part.

10. The device of claim 9 further comprising:
    an autoclave configured to apply pressure to the composite laminate part while the composite laminate part is within the vacuum bag, the caul being configured to transmit pressure to a radius formed in the composite laminate part while the autoclave is in operation.

11. The device of claim 1 further comprising:
    a stiffener; and
    a laminate spar assembled with the stiffener,
    wherein a first portion of the caul is moldable over an end of the stiffener and a second portion of the caul is moldable to a radius formed in the laminate spar.

12. The device of claim 11 further comprising:
    a layer of adhesive placed between a flange of the stiffener and a web of the spar.

13. The device of claim 4 further comprising:
    a vacuum bag substantially surrounding both the caul and the composite laminate part.

14. The device of claim 13 further comprising:
    an autoclave configured to apply pressure to the composite laminate part while the composite laminate part is within the vacuum bag, the caul being configured to transmit pressure to a radius formed in the composite laminate part while the autoclave is in operation.

15. The device of claim 4 further comprising:
    a stiffener; and
    a laminate spar assembled with the stiffener,
    wherein a first portion of the caul is moldable over an end of the stiffener and a second portion of the caul is moldable to a radius formed in the laminate spar.

16. The device of claim 15 further comprising:
    a layer of adhesive placed between a flange of the stiffener and a web of the spar.

17. The device of claim 8 further comprising:
    a vacuum bag substantially surrounding both the caul and the composite laminate part.

18. The device of claim 17 further comprising: an autoclave configured to apply pressure to the composite laminate part while the composite laminate part is within the vacuum bag, the caul being configured to transmit pressure.

* * * * *